UNITED STATES PATENT OFFICE.

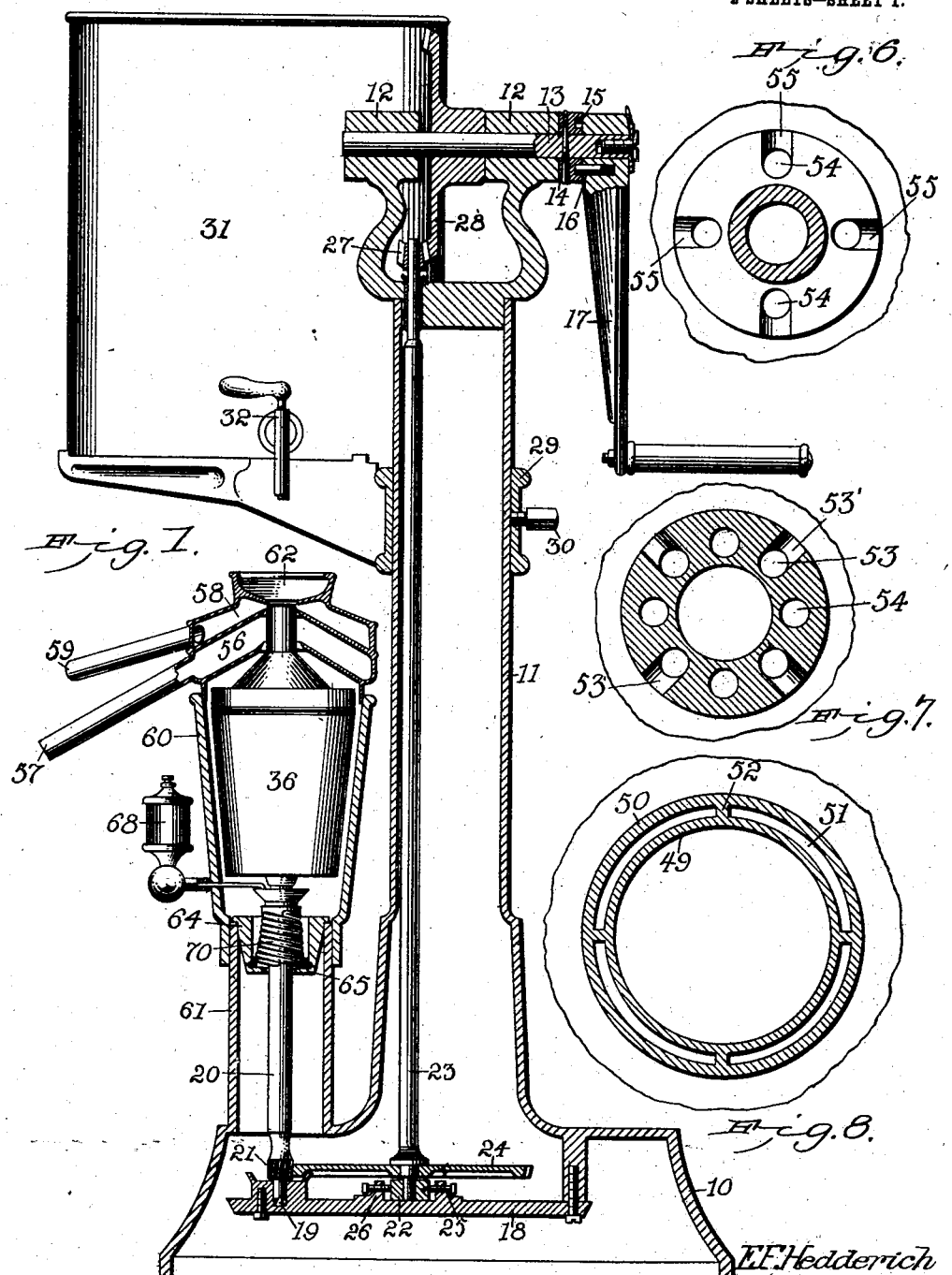

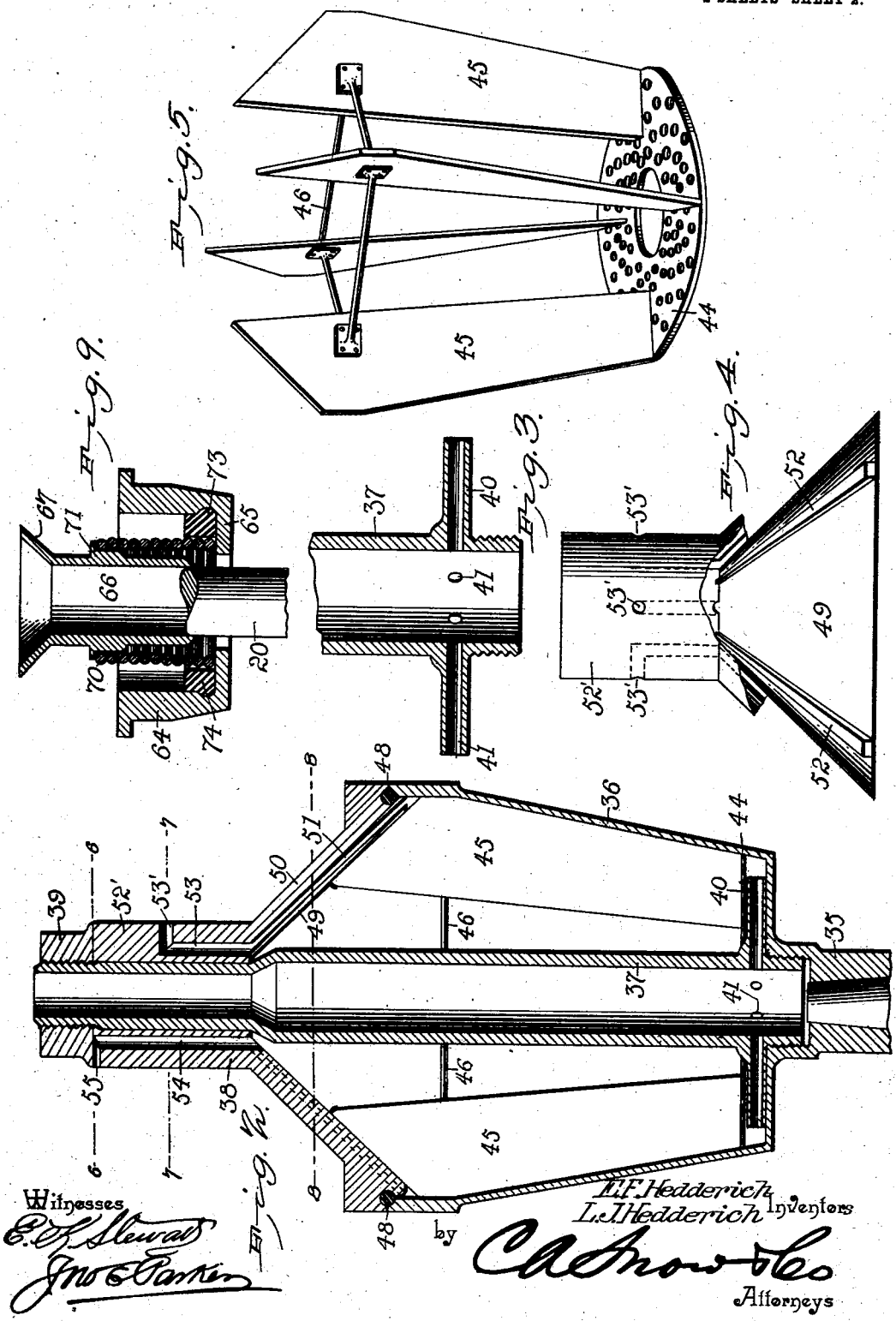

EDWARD F. HEDDERICH AND LEANDER J. HEDDERICH, OF FLORA, INDIANA.

CENTRIFUGAL CREAM-SEPARATOR.

SPECIFICATION forming part of Letters Patent No. 721,186, dated February 24, 1903.

Application filed August 14, 1902. Serial No. 119,679. (No model.)

*To all whom it may concern:*

Be it known that we, EDWARD F. HEDDERICH and LEANDER J. HEDDERICH, citizens of the United States, residing at Flora, in the county of Carroll and State of Indiana, have invented a new and useful Centrifugal Cream-Separator, of which the following is a specification.

The invention relates to certain improvements in devices for the separation of liquids of different specific gravity by centrifugal force, and has for its principal object to provide an improved form of centrifugal for the separation of cream from milk.

One of the principal objects of the invention is to provide a centrifugal separator of this class in which the full milk will be discharged in the bowl at a distance from the center of rotation greater than that which the butter-fats and lighter portions of the liquid would naturally assume in the bowl if fed at a central point and then forced outward by centrifugal force. When the globules of butter-fats are discharged in a zone greater than that warranted by their specific gravity, the adhering particles of liquid, being subjected to abnormal centrifugal force, will more readily separate from the butter-fats than if subjected to the lesser influence in that position which the butter-fats would ordinarily assume, and the separation is more readily effected, owing to the fact that the heavier and purely-liquid element is being forced toward the outer portion of the bowl, while the lighter butter-fats tend to seek a zone nearer to the center of the bowl.

A further object of the invention is to provide at the lower portion of the bowl a reticulated or similar screen through which the full milk must pass in order to break up any tendency of the entering milk to form bowl-currents and to divide the milk in such manner that it will gradually rise in a practically even layer and without setting up any independent swirling currents.

A still further object of the invention is to provide a frusto-conical separator-bowl in which the skim-milk outlet is directly at the point of largest diameter of the bowl, the "separator-milk," as it is termed, being forced to travel the full limit of the bowl and subjected to the highest centrifugal force which the apparatus is capable of developing.

A still further object of the invention is to provide improved means in the form of radially-disposed blades having their outer edges in contact with the inner surface of the bowl to prevent lagging of the fluid and cause the same to travel at the same speed as the bowl.

A still further object of the invention is to provide an improved form of skimming-cone having discharge-passages arranged in such manner as to form free outlets for the cream and milk and, further, to employ the inlet-tube for the full milk as a means of connecting the bowl and skimming-cone, permitting the ready removal of the latter in order that access may be had to the bowl for the purpose of cleaning the same.

With these and other objects in view the invention consists in the novel construction and arrangement of parts hereinafter described, illustrated in the accompanying drawings, and particularly pointed out in the appended claims.

In the accompanying drawings, Figure 1 is a longitudinal sectional elevation of a centrifugal separator constructed in accordance with our invention. Fig. 2 is a sectional elevation of the bowl drawn to an enlarged scale. Fig. 3 is a detail sectional view of the lower portion of the feed-tube through which the full milk is supplied to the bowl. Fig. 4 is a detail view of the skimming-cone, a portion of the cone being broken away in order to more clearly illustrate the interior construction. Fig. 5 is a detached perspective view of the internal blades and perforated disk employed to prevent the formation of bowl-currents. Fig. 6 is a sectional plan view on the line 6 6 of Fig. 2, illustrating the arrangement of the cream-discharge opening. Fig. 7 is a similar view on the line 7 7 of Fig. 2, showing the vertical passages for the cream and separator-milk and the discharge-outlets for the latter. Fig. 8 is a sectional plan view of the cone on the line 8 8 of Fig. 2, illustrating the arrangement of the separator-milk passages and the partitions therein. Fig. 9 is a detail sectional view of a form of flexible journal constructed in accordance with the invention.

Similar numerals of reference are employed to indicate corresponding parts throughout the several figures of the drawings.

While the device forming the subject of the present invention may be employed for the separation of cream from milk on an extensive commercial scale and for this purpose made of any size and capacity, the device as illustrated in the accompanying drawings is intended for use for the separation of comparatively small quantities of milk and for this purpose is supplied with a manually-operated crank and with a supply-tank at a comparatively small elevation, so that the full milk to be separated may be conveniently poured therein.

In the drawings, 10 represents a suitable base, from which rises a hollow standard 11, having at its upper end two bearing-brackets 12 for the support of a short crank-shaft 13, to which is secured a collar 14, having a number of openings 15 for the reception of a spring-pressed pin 16, carried by the hub portion of a handled crank 17, by which the machine is operated. Within the base of the machine is secured a bar or plate 18, having at one end a step-bearing 19 for the support of a bowl-spindle 20, the latter being provided at its lower end with a pinion 21. The bar or plate 19 supports a journal-block 22 for the reception of the lower end of a vertical shaft 23, having a gear-wheel 24, intermeshing with the pinion 21, the engaging teeth of both pinion and gear being preferably inclined in order to prevent backlashing and render the device smooth and easy running. The journal-block 22 may be adjusted by screws 25, fastened to suitable lugs 26 on the bar or plate 18, in order to properly intermesh the teeth of the gear and pinion. At the upper end of the vertical shaft 23 is a pinion 27, which intermeshes with a gear-wheel 28, the teeth of the latter being arranged in such manner as to practically form a crown-gear in order to avoid the unnecessary friction usual in miter and bevel gears. The gearing connections between the main crank-shaft and the bowl-spindle are such that the latter may be driven at very high speed without necessitating rapid working of the crank. The standard 11 is provided with a bracket 29, adjustable vertically on the standard and locked in any position to which it may be adjusted by a set-screw 30. This bracket supports a tank 31, to which whole milk is supplied and from which it is fed to the centrifugal separator by a tap 32.

To the upper end of the bowl-spindle is secured the hub portion 35 of a frusto-conical separator-bowl 36. The inner surface of the bowl for a short distance below its extreme upper edge is of substantially uniform diameter, and from thence to the bottom of the bowl the internal diameter gradually lessens in order to facilitate the upward movement of the liquid under the influence of centrifugal force. The central bottom portion of the bowl is provided with a threaded recess for the reception of the threaded lower end of a feed-tube 37, which extends upwardly above the top of the bowl and through the skimming-cone 38, its upper end being threaded for the reception of a nut 39, by which the skimming-cone is clamped firmly to the top of the bowl, the nut being readily removable when it is desired to remove the cone and clean the interior of the bowl. The filling-tube is of greater diameter at its outlet than at its inlet end in order to facilitate the entrance of the milk and prevent the liquid rising in the tube. Near the extreme lower end of the tube and fitted closely against the bottom of the bowl is a circular disk 40, forming a part of the tube, the periphery of the disk being near the inner surface of the bowl and rotated in a zone greater than that which the butter-fats and lighter portions of the whole milk would ordinarily assume within the bowl. The disk is provided with a plurality of radially-disposed passages through which the milk is forced from the tube to the bowl and being discharged near the inner surface of the bowl immediately commences to ascend in the direction of the upper discharge-outlets. When the milk discharges in this manner, it does not immediately acquire the bowl velocity, and there is danger of setting up bowl-currents or swirling. To avoid this, we employ a disk 44, formed of perforated sheet metal or wire-gauze, which breaks up the minute streams and tend to effect an even delivery against the conical wall of the bowl. To further prevent the lagging of the liquid, we employ a plurality of radially-disposed blades or plates 45, connected at their lower ends to the sheet-metal disk 44 and near their upper end being provided with connecting-bars 46. The outer edges of the blades fit snugly against the inner wall of the bowl, and the upper inclined ends thereof press against the inner face of the skimming-cone. These blades serve to carry the liquid around at the same velocity as the bowl and permit the more ready separation of the milk from the cream.

At the top of the bowl is the skimming-cone 38, the adjacent edges of the cone and bowl being recessed to receive a packing-strip 48, of rubber or similar material. The cone proper comprises inner and outer members 49 and 50, respectively, which may be formed of a single piece of metal, the space 51 between the two members being divided into a plurality of channels by radial ribs or partitions 52 and form passages for the escape of the separator-milk. The hub 52' of the cone has a central bore for the reception of the upper portion of the feeding-tube 37, and in said hub are formed a plurality of vertically-disposed passages 53 and 54, the passages 53 communicating with the passages 51 in the cone proper and terminating in discharge-ports 53' at one side of the hub, or there may be a plurality of ports extending radially and communicating with the several milk-passages, as indicated in Fig. 7. The separator-milk is discharged into a receiving-chamber 56, having an outlet-spout 57. The passages 54 are extended vertically from end to end of the hub portion of the cone and at their upper ends terminate in outwardly-directed ports 55, through which the cream escapes to a chamber 58, having an outlet-spout 59.

The bowl is surrounded by a frusto-conical casing 60, mounted on a hollow post 61, which incloses the bowl or spindle, and at the upper end of the casing 60 is mounted a removable pulley containing the chambers 56 and 58 and an upper funnel-like basin 62, directly below the tap 32 and having its discharge-opening in communication with the upper end of the milk-tube 37.

In the hollow post 61 is secured a cup 64, having a lower flange 65, provided with an opening for the passage of the bowl-spindle 20. The spindle is guided by a flexible journal formed by a sleeve 66, surrounding the spindle and having a conical or flaring upper end for the reception of lubricant from an oil-cup 68. The sleeve 66 is mounted at the upper end of a tightly-coiled spring 70, wound in slightly-tapering form, the end of smallest diameter being secured to the sleeve at a point immediately below an annular flange 71 and the larger end of the spring resting on the bottom 65 of the cup 64. The lower portion of the cup is provided with a recess 73, and into the space between the recess and the spring is poured a quantity of comparatively soft metal 74, which serves to secure the lower end of the spring in position. This flexible bearing permits easy running of the spindle, and should there be any tendency to eccentric movement the spring will gradually counteract the same and maintain the spindle in vertical position.

In the operation of the device full milk is fed through the tube 37 and discharged through the radial openings 41 at a point in the bowl between the zones with which the outlet-passages for the cream and separator-milk communicate, the point of discharging in the bowl being at all times in a zone greater than that in which the butter-fats and lighter liquid would assume when subjected to centrifugal force. By thus placing the material as a whole in an intermediate or what may be termed a "neutral" zone the liquid particles are subjected to the greatest centrifugal force, the lighter particles having a natural tendency to seek a position nearer the center of the bowl, while the liquid of heavier specific gravity is forced to the surface of the bowl. The liquid is traveled up the tapering face of the bowl until it reaches that portion of the bowl near the upper edge where the diameter is uniform. At this point the separator-milk passes up through the passages 51 and 53 and is discharged through the outlet-ports 53', while the butter-fats and other liquid are forced up through the passages 54 and discharged through the ports 55 between the top of the hub 52' and the nut 39.

As before stated, the bowl may be made of any capacity; but the machine as herein disclosed is intended principally for small consumers, the object being to provide a compact and efficient machine of economical construction.

While the construction herein described, and illustrated in the accompanying drawings, is the preferred form of the device, it is obvious that various changes in the form, proportions, size, and minor details of the structure may be made without departing from the spirit or sacrificing any of the advantages of the invention.

Having thus described our invention, what we claim is—

1. In a centrifugal separator, a bowl having at its upper portion a vertical wall at the greatest diameter of the bowl and thence gradually decreasing in diameter to the bowl-bottom to form a substantially frusto-conical bowl, and a skimming-cone secured to the top of the bowl and having discharge-passages opening at their lower ends at points adjacent to the vertical wall of the bowl, the vertical wall forming an intermediate deflector for changing the angle of flow of the milk from the inclined wall of the bowl to the oppositely-inclined passages of the cone.

2. The combination in a centrifugal separator, of a bowl having at its upper portion a vertical wall and thence extending on convergent lines to the bowl-bottom to form a substantially frusto-conical bowl, and a cone secured to the top of the bowl, said cone being provided with a passage communicating with the bowl at the top of the vertical wall for the escape of the separator-milk, and being further provided with passages for the escape of cream.

3. The combination in a centrifugal separator, of a subtantially frusto-conical bowl having a lower inlet and upper outlets, a skimming-cone secured to the top of the bowl and provided with an annular passage in communication with the point of greatest diameter of the bowl, said passage being divided by ribs or partitions into a plurality of channels, there being vertically-disposed passages in communication with said channels and terminating in discharge-ports, and said cone being further provided with a vertically-disposed cream-escape passage arranged near the inner portion of the cone, and separate receiving-chambers into which the material is discharged.

4. The combination in a centrifugal separator, of the bowl-spindle, a bowl supported thereby, a cone disposed at the top of the bowl and having discharge-passages for the separated milk and cream, a feed-tube secured at its lower end to the bowl and extending through the central portion of the cone, and a securing-nut adapted to the threaded upper end of said tube and serving to secure the cone in position on the bowl.

5. The combination in a centrifugal separator, of the spindle, a bowl mounted thereon and provided at its bottom portion with a threaded recess, a milk-feed tube having a threaded lower end adapted to said recess, a cone having discharge-passages for the separator-milk and the cream and adapted to fit against the upper edge of the bowl, said cone having a hub portion provided with a central opening for the passage for the milk-tube, and a nut adapted to the threaded upper end of said tube and serving to confine the cone in position.

6. The combination in a centrifugal separator, of the spindle, a bowl mounted thereon and having a recessed upper edge, a cone recessed at its lower edge and fitting against the top of the bowl a packing-ring adapted to said recesses, a milk-feed tube secured at its lower end to the bottom of the bowl and extending through an opening in the hub portion of the cone, and a securing-nut adapted to the threaded upper end of said tube.

7. The combination in a centrifugal separator, of a discharge-tube for supplying full milk to the separator, said discharge-tube having its outlet end in a zone beyond that subsequently assumed by the lighter portions of the compound liquid in the separator.

8. The combination in a centrifugal separator, of the bowl, a skimming-cone having discharge-outlets, and a plurality of radially-disposed blades rigidly connected to each other and having their outer edges in contact with the inner surface of the bowl and the cone.

9. The combination in a centrifugal separator, of the bowl having lower inlets, a skimming-cone having discharge-outlets, a foraminous disk located within the bowl at a point above the inlets, a plurality of radial blades secured at their lower ends to the disk and having their outer and upper edges in intimate contact with the inner walls of the bowl and cone respectively, and connecting-bars extending between said blades.

In testimony that we claim the foregoing as our own we have hereto affixed our signatures in the presence of two witnesses.

EDWARD F. HEDDERICH.
LEANDER J. HEDDERICH.

Witnesses:
ELMER M. EIKENBURY,
ERNEST W. ARLBRIGHT.